United States Patent
Kubokawa

(10) Patent No.: US 7,493,343 B2
(45) Date of Patent: Feb. 17, 2009

(54) DATA DELIVERY DEVICE AND ALTERATION METHOD OF DATA DELIVERY TIME

(75) Inventor: Yuka Kubokawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 367 days.

(21) Appl. No.: 11/114,032

(22) Filed: Apr. 26, 2005

(65) Prior Publication Data

US 2006/0041571 A1 Feb. 23, 2006

(30) Foreign Application Priority Data

Apr. 27, 2004 (JP) ............................ P2004-131877

(51) Int. Cl.
*G06F 17/30* (2006.01)
*G06F 7/00* (2006.01)
(52) U.S. Cl. ..................................... 707/104.1; 707/10
(58) Field of Classification Search .............. 707/104.1, 707/10
See application file for complete search history.

(56) References Cited

U.S. PATENT DOCUMENTS 6,647,257 B2 * 11/2003 Owensby ................. 455/414.1
2002/0111855 A1 * 8/2002 Hammerstad ................. 705/14
2003/0005133 A1 * 1/2003 Banerjee et al. ............. 709/229
2003/0045273 A1 3/2003 Pyhalammi et al.
2003/0061206 A1 * 3/2003 Qian ............................. 707/3
2003/0083937 A1 * 5/2003 Hasegawa et al. ............. 705/14
2003/0130894 A1 * 7/2003 Huettner et al. ................ 705/14
2004/0187159 A1 * 9/2004 Gaydos et al. ................. 725/92
2005/0132016 A1 * 6/2005 Boone ......................... 709/207
2005/0188406 A1 * 8/2005 Gielow et al. ................. 725/81

FOREIGN PATENT DOCUMENTS

| EP | 0 933 941 A2 | 8/1999 |
| EP | 1 351 489 A2 | 10/2003 |
| JP | 2000-122953 | 4/2000 |

* cited by examiner

*Primary Examiner*—Kuen S Lu
(74) *Attorney, Agent, or Firm*—Oblon, Spivak, McClelland, Maier & Neustadt, P.C.

(57) ABSTRACT

As an embodiment, a delivery data management section stores data to be delivered and an access status management section stores information indicating the frequency of use of a client terminal and a used time zone. A delivery time calculation section picks out a time zone of which frequency of use of a portable unit is smaller based on the stored information indicating the frequency of use, and determines the picked out time zone as the delivery time of the data, and a delivery section delivers the data stored in the delivery data management section at the determined delivery time.

3 Claims, 7 Drawing Sheets

Fig.3

| | HOUR | 0 | | 1 | | 2 | | 3 | | 4 | | ... | 20 | | 21 | | 22 | | 23 | |
|---|---|---|---|---|---|---|---|---|---|---|---|---|---|---|---|---|---|---|---|---|
| | MINUTE | 0 | 30 | 0 | 30 | 0 | 30 | 0 | 30 | 0 | 30 | | 0 | 30 | 0 | 30 | 0 | 30 | 0 | 30 |
| Sun | COMMUNICATION FREQUENCY | 12 | 15 | 12 | 1 | 0 | 0 | 0 | 0 | 0 | 0 | | | | · · · | | 12 | 15 | 23 | 26 |
| | OPERATION FREQUENCY | 13 | ... | 12 | 1 | 0 | 0 | 0 | 0 | 0 | 0 | | | | | | | | | |
| Mon | COMMUNICATION FREQUENCY | | | | | | | | | | | | | | | | | | | |
| | OPERATION FREQUENCY | | | | | | | | | | | | | | | | | | | |
| Tue | COMMUNICATION FREQUENCY | | | | | | | | | | | | | | | | | | | |
| | OPERATION FREQUENCY | | | | | | | | | | | | | | | | | | | |
| Wed | COMMUNICATION FREQUENCY | | | | | | | | | | | | | | | | | | | |
| | OPERATION FREQUENCY | | | | | | | | | | | | | | | | | | | |
| Thu | COMMUNICATION FREQUENCY | | | | | | | | | | | | | | | | | | | |
| | OPERATION FREQUENCY | | | | | | | | | | | | | | | | | | | |
| Fri | COMMUNICATION FREQUENCY | | | | | | | | | | | | | | | | | | | |
| | OPERATION FREQUENCY | | | | | | | | | | | | | | | | | | | |
| Sat | COMMUNICATION FREQUENCY | | | | | | | | | | | | | | | | | | | |
| | OPERATION FREQUENCY | | | | | | | | | | | | | | | | | | | |

Fig.5

| | | |
|---|---|---|
| 501 | TELEPHONE NUMBER | 0901111111 |
| 502 | DAY OF WEEK | Tue |
| 503 | TIME | 0000 |
| 504 | COMMUNICATION ACCESS STATUS | 1 |
| 505 | ACCESS STATUS OF TERMINAL | 1 |

DATA DELIVERY DEVICE AND ALTERATION METHOD OF DATA DELIVERY TIME

BACKGROUND OF THE INVENTION

1. Field of the Invention

The present invention relates to a data delivery device, which delivers data to a client terminal at a preset point of time, and an alteration method of a data delivery time.

2. Related Background Art

In these years, a data delivery device, which delivers data responding to a request for data delivery from a client terminal such as a portable unit, is known. Also, Japanese Patent Application Laid-Open No. 2000-122953 (hereinafter, referred to as "document 1") discloses the technique in which an operator sets up a delivery time for the client terminal of the data delivery device, and when the preset delivery time has been reached, the data delivery device delivers the data to the preset client terminal. The document 1 describes the following; i.e., a server system, which delivers data, stores a delivery schedule and an allowable range of the delivery time prescribed by the schedule beforehand, and carries out the data delivery to the prescribed client terminal in accordance with the schedule and the allowable range thereof.

SUMMARY OF THE INVENTION

However, in the conventional data delivery device in which the data delivery is carried out responding to a request from the client terminal, since a user using the client terminal has to issue a delivery request, there resides an inconvenience in use thereof.

Further, in the delivery method disclosed in the document 1, since the data are delivered irrespective of the convenience of the user of the client terminal as a delivery destination, there resides the following problems. That is, there resides a problem that there is such a case that, when the data delivery is carried out from a data delivery device while the user is operating the client terminal, the user's operation has to be suspended, which is not convenient for the user. In order to solve the above problem, when the priority is given to the convenience of the user, there may be such a case that the data delivery from the data delivery device has to be suspended, and the data delivery has to be carried out from the beginning again. Thus, there resides such a problem that data is not able to be delivered effectively.

On the other hand, it is also conceivable that the user determines the time when the data delivery is carried out, and makes a setting so that the data delivery device performs the data delivery at a convenient time for the user itself. However, there still resides such a problem that the user suffers some inconveniences because the above method requires the user to carry out a set-up operation.

Accordingly, in order to solve the above problems, it is an object of the present invention to provide a data delivery device capable of carrying out the data delivery effectively without requiring the user to carry out any operation, and an alteration method of the data delivery time.

To solve the above-mentioned problems, the data delivery device according to the present invention includes storage means that stores data, management means that stores information indicating the frequency of use of a client terminal and a used time zone, determination means that determines a time zone picked out based on the frequency of use of the client terminal stored in the management means as the delivery time of the data stored in the storage means, and delivery means that delivers the data stored in the storage means at the delivery time determined by the determination means.

Also, the alteration method of data delivery time according to the present invention includes the steps of receiving information indicating frequency of use of a client terminal and information indicating a used time zone, determining the time zone picked out based on the received frequency of use as the delivery time of the data, and delivering the data at the determined delivery time.

The above-described architecture according to the present invention is adapted so as to store the frequency of use of the client terminal, determine the time zone, which is picked out based on the stored frequency of use, as the data delivery time and delivers the data at the data delivery time. Thereby, the data delivery device can deliver the data effectively to the client terminal without requiring a user to set up the delivery time.

Further, the storage means according to the present invention is adapted so as to further store a delivery time limit for delivering the data, and the determination means is adapted so as to determine the time zone picked out based on the frequency of use of the client terminal within the delivery time limit stored in the storage means as the delivery time.

The above-described architecture according to the present invention is adapted so as to store the time limit for delivering the data and to deliver the data using the time zone, which is picked out based on the frequency of use of the client terminal within the delivery time limit, as the delivery time. Accordingly, the delivery can be carried out effectively to the client terminal while preventing such status that data is hardly delivered.

According to the present invention as described above, the frequency of use of the client terminal is stored, a time zone, which is picked out based on the stored frequency of use, is determined as the data delivery time, and the data are delivered at the data delivery time. Thereby, the data delivery device can deliver the data effectively to the client terminal without requiring a user to set up the delivery time.

BRIEF DESCRIPTION OF THE DRAWINGS

FIG. 3 is a diagram showing a management table for storing access status of a portable unit, which is stored in an access status management section 102 of the data delivery device 100 in accordance with the present invention;

FIG. 5 is an explanatory diagram for illustrating a data format of information of access status, which is notified by an access status notification section 201 in the portable unit 200 in accordance with the present invention;

DESCRIPTION OF THE PREFERRED EMBODIMENTS

Hereinafter, the data delivery device and the alteration method of data delivery time in accordance with the present invention will be described with reference to the drawings.

Figure 1:
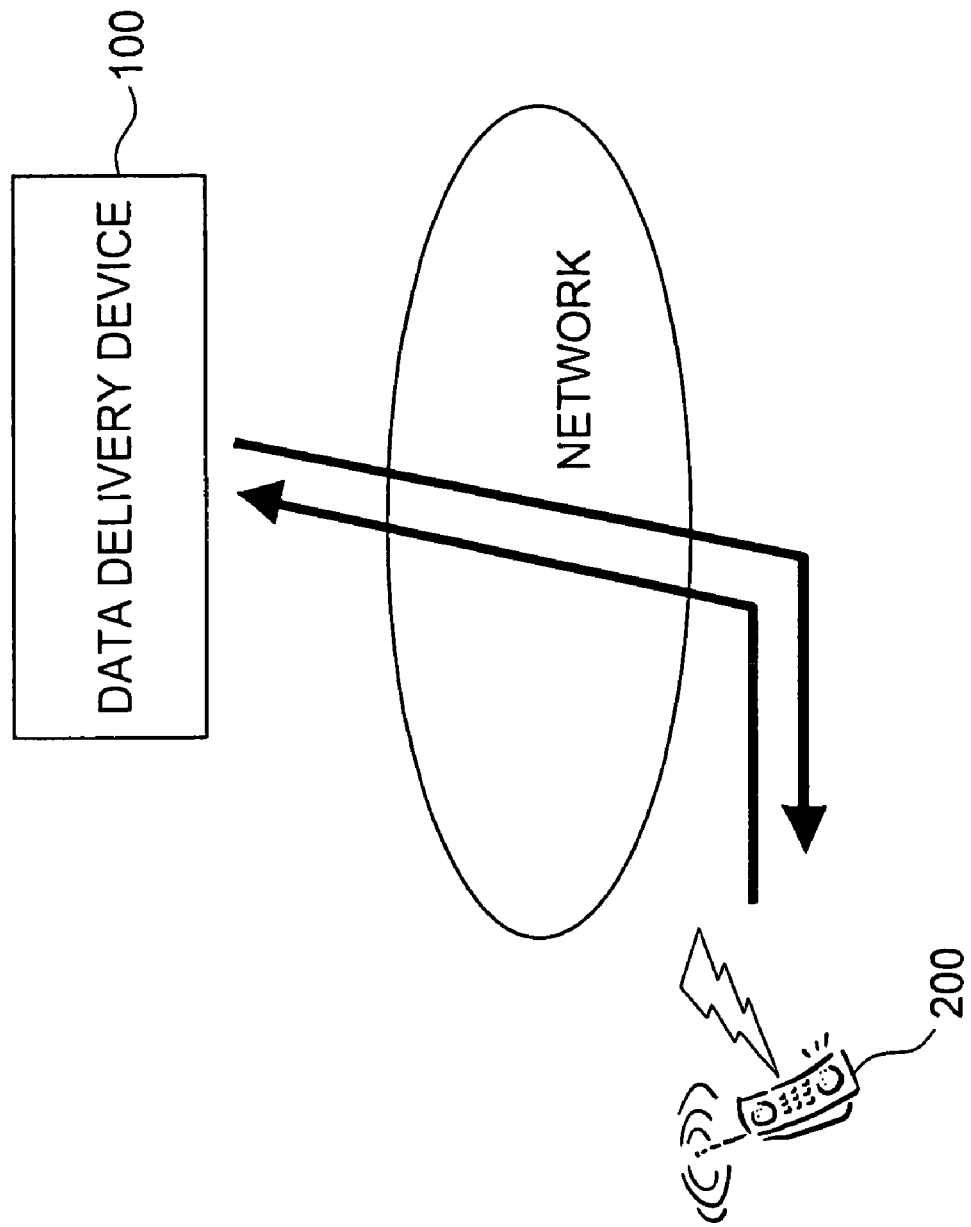
FIG. 1 is a diagram showing architecture of a system in a network in accordance with the present invention.

First of all, a relationship between the data delivery device 100 and the portable unit 200 of the present invention will be described with reference to a drawing. FIG. 1 is a system conceptual diagram showing a network system, which is constituted of the data delivery device 100 and the portable unit 200.

When a preset point of time has been reached, irrespective of a delivery request from the portable unit 200 as a client terminal, the data delivery device 100 delivers data such as a pattern file to be updated to the portable unit 200. Also, the portable unit 200 notifies information of access status to the data delivery device 100. The information of access status includes information of communication access status and information of terminal operation status. The information of communication access status represents the communication frequency such as packet transfer communication and a telephone call. The information of terminal operation status represents the operation frequency of the terminal such as manipulating a button and opening/closing a display panel in creating an address book and in creating a mail text.

The data delivery device 100 sorts the received information representing the communication access status as the communication frequency information, which represents the communication frequency, and the information representing the access status of the terminal as the operation frequency information, which represents the operation frequency of the terminal, and stores them. And the data delivery device 100 determines the point of time when the data delivery is performed to the portable unit 200 based on these communication frequency information and operation frequency information, and takes a control so that the data delivery is carried out at the corresponding point of time. The client terminal as the delivery destination of the data delivery device 100 may be, in place of the portable unit 200 such as a mobile phone, a communication unit installed in a stationary manner; for example, a personal computer is applicable.

Hereinafter, the data delivery device 100 and the portable unit 200 will be described.

Figure 2:
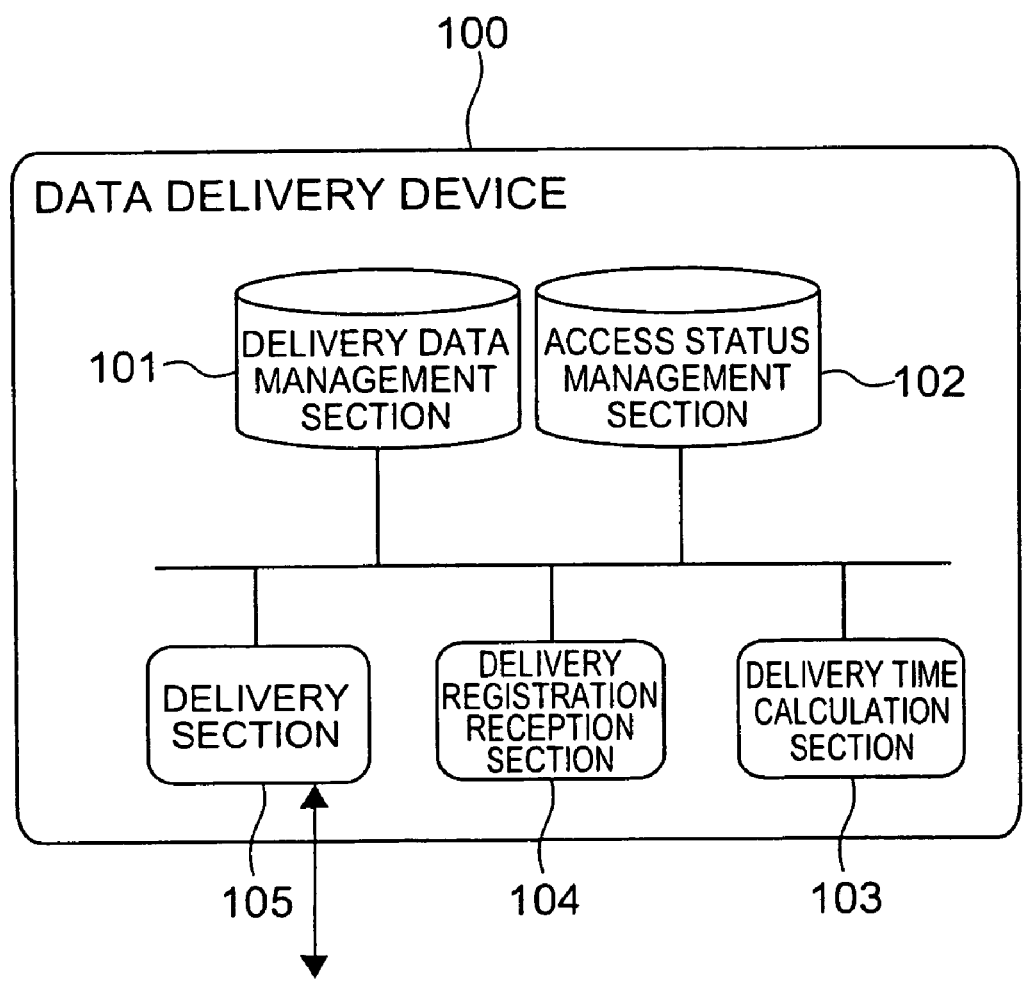
FIG. 2 is a block diagram showing a configuration of a data delivery device 100 in accordance with the present invention.

First, the data delivery device 100 in accordance with the present invention is described. FIG. 2 is a block diagram showing a configuration of the data delivery device 100 in accordance with the present invention.

The data delivery device 100 includes a delivery data management section 101 (storage means in the present invention), an access status management section 102 (management means in the present invention), a delivery time calculation section 103 (determination means in the present invention), a delivery registration reception section 104 and a delivery section 105 (delivery means in the present invention).

The delivery data management section 101 stores data to be delivered to the portable unit 200.

The access status management section 102 registers the following information as the information of frequency of use in the management table provided within the access status management section 102; i.e., the communication frequency information, which represents the communication frequency of packet transfer communication, a telephone call or the like in the portable unit 200 managed by the data delivery device 100, and the operation frequency information, which represents the operation frequency with respect to manipulating the button and opening/closing the display panel in creating the address book, in creating the mail text and the like in the portable unit 200. The management table for storing the information of frequency of use comprised of these communication frequency information and operation frequency information is created based on the information of access status, which is regularly transferred by the portable unit 200 to the data delivery device 100. The management table is independently created based on the information identifying the portable unit 200. Detailed description of the above will be given later.

Here, the management table for storing the information of frequency of use received by the data delivery device 100 is described. FIG. 3 shows a management table for storing the information of frequency of use.

As shown in FIG. 3, in the management table for storing the information of frequency of use, the communication frequency information and the operation frequency information are written being sorted on the basis of the day of week and the time zone. The so-called communication frequency information represents the frequency of use as to how many times the access for communication is made in each time zone (communication frequency). The so-called operation frequency information represents the frequency of use as to how many times the operation such as the terminal operation is performed (operation frequency).

For example, in the column of 0:30-1:00 of "SUN" (Sunday), the communication frequency information is written as "15". The numerical values written in these columns are the values representing the communication frequency, which are created based on the information of access status transferred from the portable unit 200. Now, the creating steps to write the values (communication frequency and operation frequency) in the management table shown in FIG. 3 are described.

Before describing the creating steps of the management table, a block diagram showing the configuration of the portable unit 200 is described.

Figure 4:
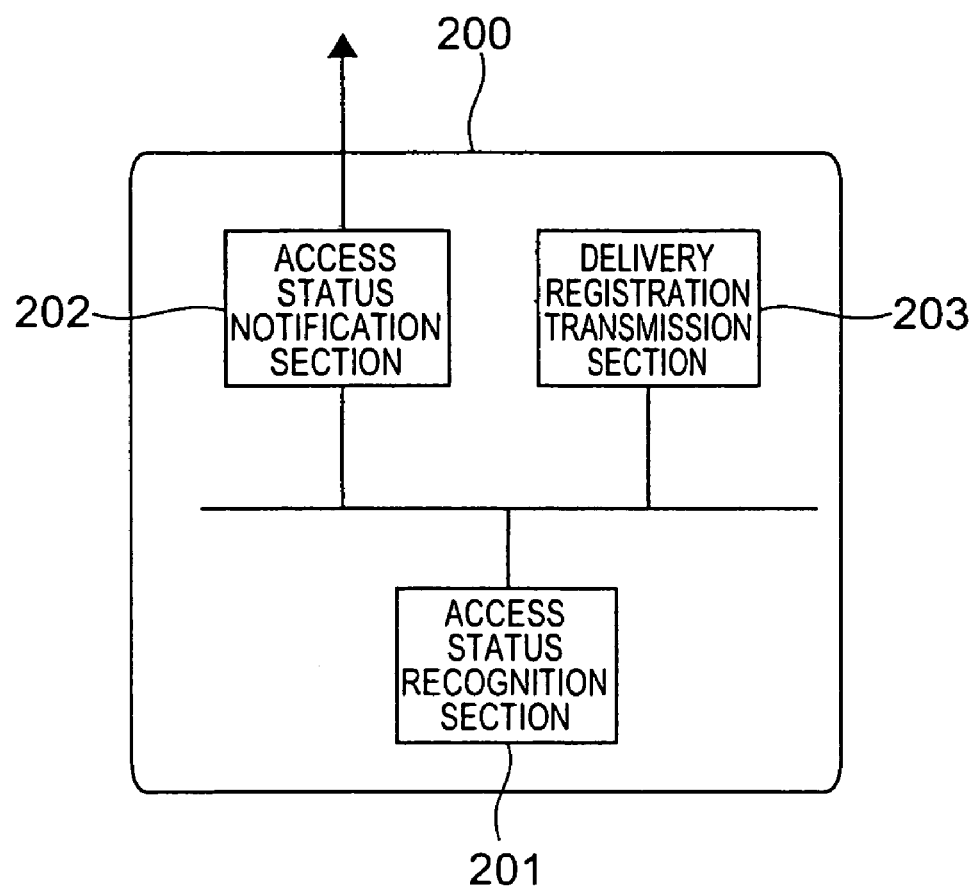
FIG. 4 is a block diagram showing a configuration of a portable unit 200 in accordance with the present invention.

FIG. 4 is a block diagram showing the configuration of the portable unit 200. The portable unit 200 is a mobile phone. Although the portable unit 200 has basic functions such as a telephone call function, a mail communication function, and a web access function, these functions are omitted in FIG. 4. As the characteristic portions relevant to the present invention, the portable unit 200 includes an access status recognition section 201, an access status notification section 202 and a delivery registration transmission section 203.

The access status recognition section 201 recognizes the access status of the portable unit 200. The access status recognition section 201 recognizes the communication status in progress such as a telephone call, mail communication, and web access. Also, the access status recognition section 201 recognizes the operation status such as the status of manipulating the button and the status of opening/closing the display panel in the operation for the telephone call, in the operation for the mail communication, in the operation for the web access, etc. When the access status recognition section 201 recognizes the communication status and the operation status respectively, the access status recognition section 201 sorts a communication flag representing the communication status and an operation flag representing the operation status, and temporally stores them therein.

Then, the access status notification section 202 transfers the information of access status including the temporally stored information to the data delivery device 100 at every preset point of time (for example, every 10 minutes). The data format of the information of access status is described. FIG. 5 is an explanatory diagram showing the data format of the information of access status, which is transferred from the portable unit 200 to the data delivery device 100.

As shown in FIG. 5, the information of access status includes information of a telephone number 501, which is the information for identifying the portable unit 200, information of the day of week 502, which is the information for specifying the notified day of week, information of a time 503, which is the information for specifying the notified point of time, information 504, which represents communication access status of packet transfer communication and the like, and information 505, which represents the access status of the terminal with respect to the operation such as the mail creation in the portable unit 200. The access status notification section 201 generates this information of access status.

Before transferring the information of access status, the access status notification section 202 generates the information of access status. That is, when at least anyone of the communication flag and the operation flag is stored temporally in the access status recognition section 201, the access status notification section 202 picks up the held communication flag or operation flag. When the communication flag is picked up, "1" is written in the information 504 representing the communication access status of the information of access status shown in FIG. 5. Likewise, when the operation flag is picked up, "1" is written in the information 505 representing the access status of the terminal. Further, when neither the communication flag nor the operation flag is held, the access status notification section 202 writes "0", respectively, in the information 504 representing the communication access status and the information 505 representing the access status of the terminal.

Referring to FIG. 4 again, the access status notification section 202 sets up the point of time when the information of access status should be transferred, the day of week when the same should be transferred, and a telephone number as the information to identify the portable unit 200 in the information of access status.

The access status notification section 202 transfers the information of access status, which has been generated as described above, to the data delivery device 100. The access status notification section 202 performs the generating operation and transmitting operation of the information of access status at preset intervals of time. When the transmitting operation by the access status notification section 202 has been completed, the communication flag and the operation flag, which are temporally stored in the access status recognition section 201, are deleted.

The delivery registration transmission section 203 is for making a registration so that the data delivery device 100 carries out the delivery of data to the portable unit 200. When the delivery registration transmission section 203 receives a response to the effect that the registration has been received from the data delivery device 100, it means that the information for identifying the portable unit has been registered in the data delivery device 100 as the delivery destination of the data.

The data delivery device 100 having received the information of access status from the portable unit 200 notifies the information of access status to the access status management section 102. When "1" is written in anyone of the information 504 representing the communication access status and the information 505 representing the access status of the terminal in the received information of access status, the access status management section 102 picks out the telephone number from the information of access status, and calls out the management table corresponding to the picked out telephone number.

Further, based on the day of week and the point of time written in the information of access status, the access status management section 102 makes a determination as to on what day of week and in what time zone the communication frequency information or the operation frequency information should have 1 added. And when the access status management section 102 determines that, on the determined day of week and time zone, "1" is written in the information 504 representing the communication access status received from the portable unit 200, the access status management section 102 adds 1 to the value written in the communication frequency information on the relevant day of week and time zone in the management table. And when the access status management section 102 determines that "1" is written in the information 505 representing the access status of the terminal received from the portable unit 200, the access status management section 102 adds 1 to the value written in the operation frequency information on the relevant day of week and time zone in the management table.

The portable unit 200 regularly transfers the information of access status to the data delivery device 100, and the data delivery device 100 receives the information of access status and carries out the above-described processing. Every time when the access status management section 102 receives the information of access status, from the portable unit 200, in which anyone of the information representing the communication access status and the information representing the access status of the terminal has "1" added, the access status management section 102 adds 1 in a cumulative manner to the value written in the communication frequency information or the operation frequency information stored in the management table. Thereby, the past communication frequency and operation frequency in a preset time zone can be registered in the management table. And by specifying the registration time limit of the management table, it is possible to manage the past communication frequency and operation frequency within the specified period of time.

In the column of, for example, "0:30-1:00" of "SUN" in the management table shown in FIG. 3, a value of "15" is written. This means the following fact. That is, the information of access status, in which the information 504 representing communication access status has "1" written, has been transferred 15 times from the portable unit 200 to the communication frequency information on Sunday, 0:30-1:00 in the management table. Likewise, the other values indicate how many times the information of access status has been transferred from the portable unit 200.

In the management table in FIG. 3 and in the explanatory diagram illustrating the information of access status shown in FIG. 5, the access status notification section 201 creates the information 502 specifying the day of week and transfers the same to the data delivery device 100, and the data delivery device 100 can obtain the communication frequency information and the operation frequency information on the basis of the day of week. However, in place of the basis of day of week, it may be adapted so that, using the information specifying the date, the communication frequency information and the operation frequency information are obtained on the basis of the date.

By carrying out the above processing, the access status management section 102 creates the management table shown in FIG. 3 based on the information of access status received from the portable unit 200.

Next, the description returns to the block diagram showing the configuration of the data delivery device 100 in FIG. 2. The delivery time calculation section 103 calculates the point of time for delivering the data stored in the delivery data management section 101. The delivery time calculation section 103 calculates the time zone when the portable unit 200 is used with smaller frequency based on the information of access status of the portable unit 200 stored in the access status management section 102.

In particular, the delivery time calculation section 103 picks out the time zone when the portable unit 200 is used for communication and operation with smaller frequency based on the information of access status stored in the access status management section 102, which is transferred from the portable unit 200, and determines the picked out time zone as the delivery time. That is, the time zone having the smallest communication frequency is picked out in the entire time zone managed by the management table, and the picked out time zone is determined as the delivery time. In the case where the delivery time cannot be determined based on the communication frequency information like the case where plural time zones are picked out, the delivery time is determined based on the operation frequency information. The delivery section 105, which will be described later, delivers the data on the basis of the determined point of time.

The delivery registration reception section 104 receives the data to be delivered to the portable unit 200 owing to the operation of the data delivery device 100 by an operator. Also, the delivery registration reception section 104 receives the delivery time limit, which is the time limit for carrying out the data delivery, owing to the operation by the operator. The delivery registration reception section 104 registers the received data and the information indicating the delivery time limit in the delivery data management section 101.

When the delivery registration reception section 104 has received the data and the delivery time limit to be delivered, and registered the same in the delivery data management section 101, the delivery section 105 delivers the registered data within the delivery time limit in accordance with the delivery time calculated by the delivery time calculation section 103. The delivery section 105 receives the communication frequency information and the operation frequency information stored in the access status management section 102 as the information of access status from the portable unit 200, generates the communication frequency information and the operation frequency information from the received information of access status, and registers them in the access status management section 102.

Figure 6:
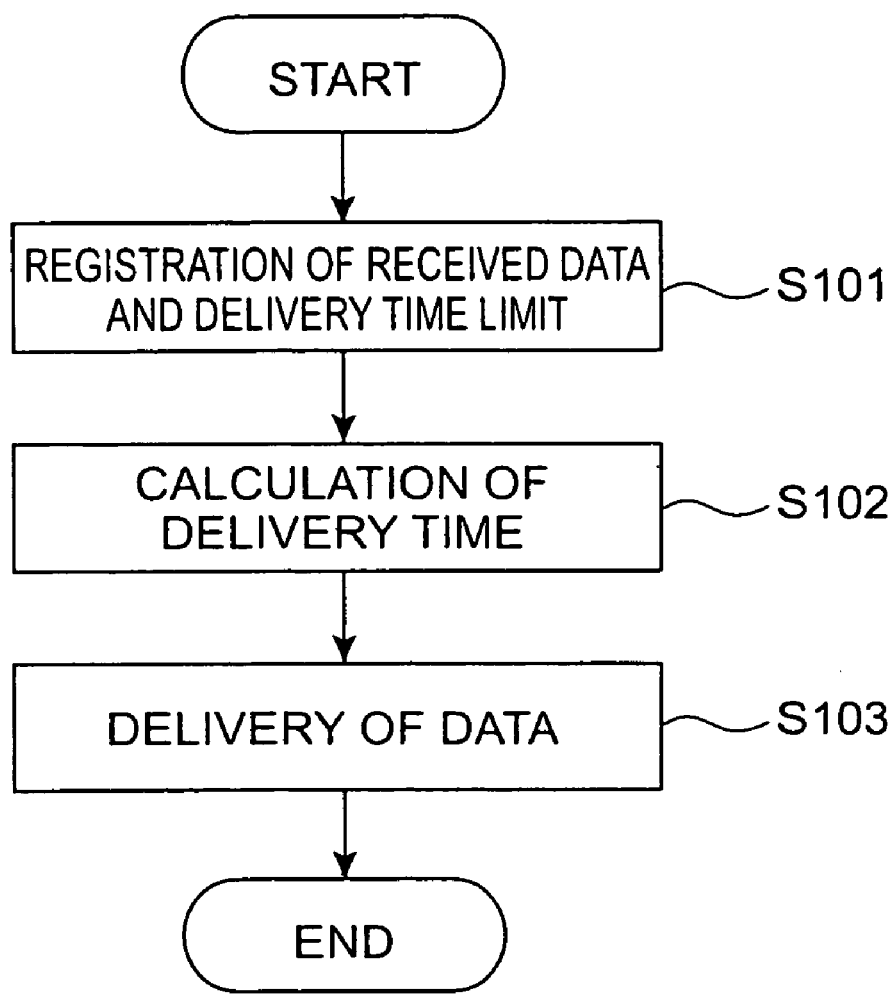
FIG. 6 is an operation flowchart when the data delivery device 100 of the present invention performs data delivery processing.

The process to carry out the data delivery using the data delivery device 100 and the portable unit 200, which are configured as described above, is described. FIG. 6 is an operation flowchart when the data delivery device 100 carries out the delivery operation.

The delivery registration reception section 104 in the data delivery device 100 receives the data to be delivered and the delivery time limit indicating by what time the data should be transferred owing to the operation of the data delivery device 100 by the operator, and the delivery registration reception section 104 registers the received data and the delivery time limit in the delivery data management section 101 (S101). Then, the delivery time calculation section 103 calculates the delivery time for carrying out the data delivery (S102). Here, based on the delivery time limit registered in S101 and the communication frequency information and the operation frequency information of the portable unit 200 stored in the access status management section 102, the time zone prior to the above-described delivery time limit, in which the communication frequency of the portable unit 200 is smaller, and the operation frequency of the portable unit 200 is smaller, is picked out to calculate this as the delivery time. The determination method of the delivery time will be described later in detail.

When the delivery time calculation section 103 has determined the delivery time, the delivery section 105 delivers the registered data at the delivery time determined by the delivery time calculation section 103 (S103).

Figure 7:
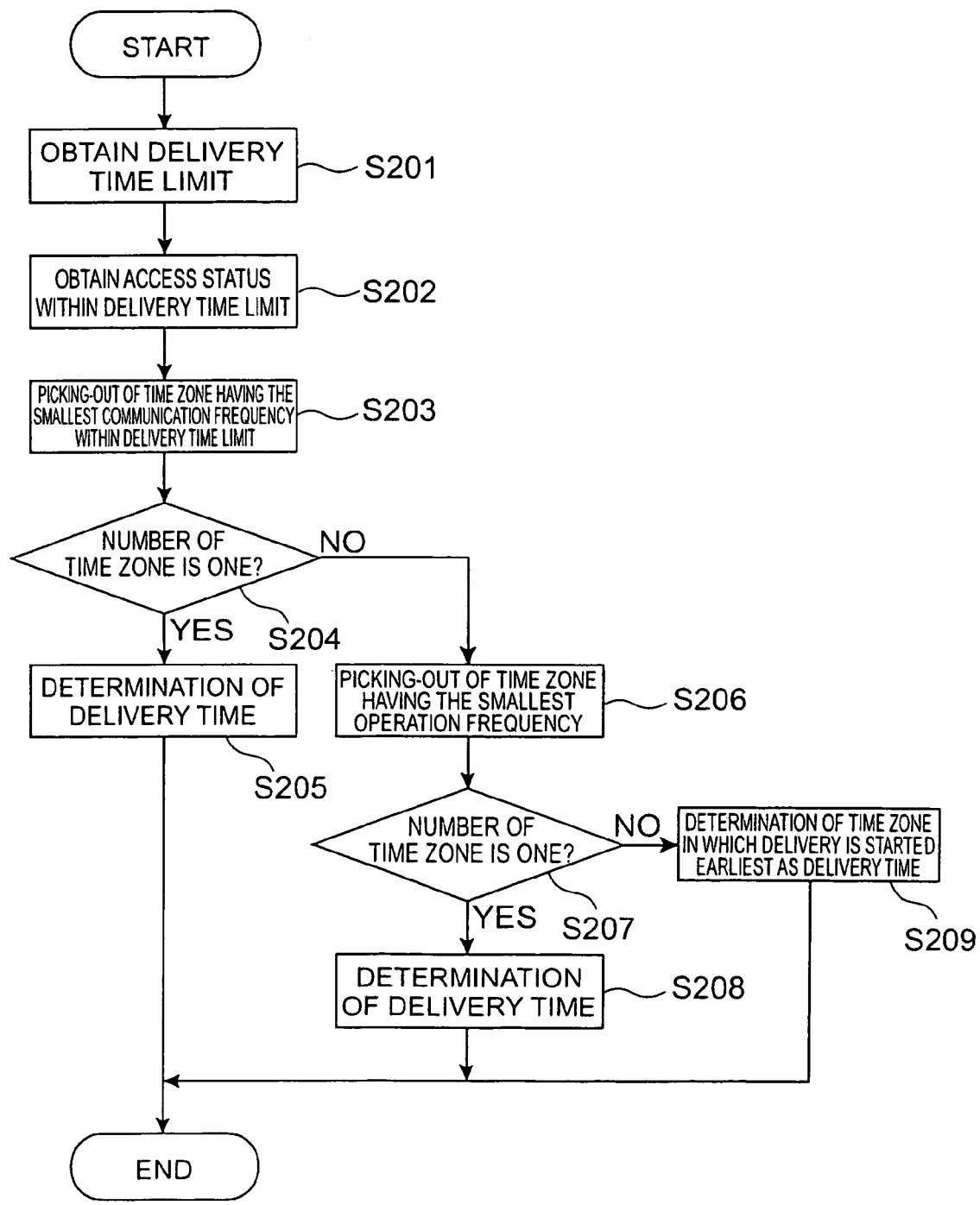
FIG. 7 is an operation flowchart when the data delivery device 100 of the present invention determines the data delivery time based on the frequency of use of the portable unit.

Next, referring to FIG. 7, the operation to determine the above-described delivery time is described in detail. FIG. 7 is a detailed operation flowchart when the delivery time calculation section 103 in the data delivery device 100 determines the point of time for carrying out the delivery based on the access status of the portable unit 200.

The delivery time calculation section 103 in the data delivery device 100 obtains the registered delivery time limit owing to the operation of the data delivery device 100 by the operator (S201). Then, the delivery time calculation section 103 obtains the communication frequency information and the operation frequency information, with respect to the portable unit 200, within the obtained delivery time limit described above from the access status management section 102 (S202).

Based on the communication frequency information obtained from the access status management section 1 02, the delivery time calculation section 103 picks out the time zone having the smallest communication frequency within the delivery time limit (S203). When the delivery time calculation section 103 determines that the number of the time zone picked out from the access status management section 102 is one (S204), the picked out time zone is determined as the delivery time (S205).

When the delivery time calculation section 103 determines that there are plural picked-up time zones having the smallest communication frequency, based on the operation frequency information of the portable unit 200, the delivery time calculation section 103 picks out the time zone having the smallest operation frequency (S206) When the delivery time calculation section 103 determines that the number of the time zone picked out from the access status management section 102 is one (S207), the delivery time calculation section 103 determines that the picked out time zone is the delivery time (S208).

Based on the operation frequency information picked out from the access status management section 102, when the delivery time calculation section 103 determines that there are plural time zones having the smallest operation frequency (S207), the delivery time calculation section 103 determines that out of the picked out time zones, the time zone in which the delivery can be started earliest is the delivery time (S209).

As described above, when plural time zones are picked out, based on the communication frequency information, as to the time zone to be picked out, the time zone having smaller communication frequency is determined as the delivery time on the priority basis. Thereby, the communication of the data can be reliably carried out.

It may be adapted so that, based on the frequency of use having the communication frequency representing the communication frequency information and the operation frequency representing the operation frequency information combined, the time zone having the smallest frequency of use is determined as the delivery time.

The effect of the above-described processing using the data delivery device 100 according to the present invention is described.

The data delivery device 100 according to the present invention stores the frequency of use of the portable unit 200, determines the time zone picked out based on the stored frequency of use as the data delivery time and delivers the data at the corresponding data delivery tine. Accordingly, it is possible to effectively deliver the data to the portable unit 200 without requiring the user to set up the delivery time.

The data delivery device 100 according to the present invention stores the time limit for delivering the data, picks out the time zone having smaller communication frequency and operation frequency of the portable unit 200 within a delivery time limit and delivers the data in the time zone.

Accordingly, the delivery to the portable unit 200 can be carried out effectively while preventing such status that the data is hardly delivered.

The disclosure of Japanese Patent Application No. 2004-131877 filed Apr. 27, 2004 including specification, drawings and claims is incorporated herein by reference in its entirety.

What is claimed is:

1. A data delivery device, comprising:

storage means for storing data;

management means for storing information indicating a frequency of use of a client terminal for each of a plurality of time zones;

determination means for determining one of the plurality of time zones having a smallest frequency of use of the client terminal, based on the information indicating the frequency of use of the client terminal stored in the management means, as a delivery time of the data stored in the storage means; and delivery means for delivering the data stored in the storage means at the delivery time determined by the determination means, wherein the storage means further stores a delivery time limit for delivering the data, and the determination means determines the time zone picked out based on the frequency of use of the client terminal within the delivery time limit stored in the storage means, as the delivery time.

2. A method of delivering data, comprising the steps of:

receiving information indicating a frequency of use of a client terminal and for each of a plurality of time zones;

determining one of the plurality of time zones having a smallest frequency of use of the client terminal, based on the received frequency of use within a delivery time limit stored in storage, as a delivery time of the data; and delivering the data at the determined delivery time.

3. A data delivery device, comprising:

a storage unit configured to store data;

a management unit configured to store information indicating a frequency of use of a client terminal for each of a plurality of time zones;

a determination unit configured to determine one of the plurality of time zones having a smallest frequency of use of the client terminal, based on the information indicating the frequency of use of the client terminal stored in the management unit, as a delivery time of the data stored in the storage unit; and a delivery unit configured to deliver the data stored in the storage unit at the delivery time determined by the determination unit, wherein the storage unit further stores a delivery time limit for delivering the data, and the determination unit determines the time zone picked out based on the frequency of use of the client terminal within the delivery time limit stored in the storage unit, as the delivery time.

* * * * *